US008964041B2

(12) United States Patent
Forssén et al.

(10) Patent No.: US 8,964,041 B2
(45) Date of Patent: Feb. 24, 2015

(54) SYSTEM AND METHOD FOR VIDEO STABILIZATION OF ROLLING SHUTTER CAMERAS

(75) Inventors: Per-Erik Forssén, Linköping (SE); Erik Ringaby, Linköping (SE)

(73) Assignee: FR Vision AB, Linkoping (SE)

(*) Notice: Subject to any disclaimer, the term of this patent is extended or adjusted under 35 U.S.C. 154(b) by 453 days.

(21) Appl. No.: 13/081,534

(22) Filed: Apr. 7, 2011

(65) Prior Publication Data

US 2011/0211082 A1 Sep. 1, 2011

(51) Int. Cl.
*H04N 5/228* (2006.01)
*H04N 5/232* (2006.01)
*G06T 7/20* (2006.01)

(52) U.S. Cl.
CPC .......... *H04N 5/23254* (2013.01); *G06T 7/2033* (2013.01); *H04N 5/23248* (2013.01); *H04N 5/23258* (2013.01); *H04N 5/23267* (2013.01); *H04N 5/2329* (2013.01); *G06T 2207/30244* (2013.01)
USPC .................. 348/208.2; 348/208.1; 348/208.3; 348/208.4; 382/254; 382/255; 382/275

(58) Field of Classification Search
CPC ............ H04N 5/23248; H04N 5/2329; H04N 5/23258; H04N 5/23267; H04N 5/23254; H04N 5/23274; H04N 5/23261

USPC ......... 348/208.2, 208.1–208.4; 382/254, 255, 382/275
See application file for complete search history.

(56) References Cited

U.S. PATENT DOCUMENTS

| | | | |
|---|---|---|---|
| 6,738,424 B1 * | 5/2004 | Allmen et al. | 375/240.08 |
| 8,054,335 B2 * | 11/2011 | Deng et al. | 348/208.1 |
| 8,350,922 B2 * | 1/2013 | D'Angelo et al. | 348/222.1 |
| 8,786,716 B2 * | 7/2014 | Zhou | 348/208.4 |
| 8,792,009 B2 * | 7/2014 | Oota | 348/208.1 |
| 8,896,713 B2 * | 11/2014 | Corey et al. | 348/208.4 |
| 2003/0063777 A1 * | 4/2003 | Trajkovic et al. | 382/107 |
| 2009/0160957 A1 | 6/2009 | Deng | |
| 2010/0079481 A1 * | 4/2010 | Zhang et al. | 345/595 |
| 2012/0069203 A1 * | 3/2012 | Voss et al. | 348/208.1 |
| 2012/0092559 A1 * | 4/2012 | Ubillos | 348/607 |
| 2013/0044228 A1 * | 2/2013 | Corey et al. | 348/208.2 |

* cited by examiner

*Primary Examiner* — Antoinette Spinks
(74) *Attorney, Agent, or Firm* — Sarah Rodriguez (57) ABSTRACT

Example embodiments presented herein are directed towards rolling shutter video stabilization utilizing three dimensional motion analysis. In stabilizing the rolling shutter video, a three dimensional motion of the device capturing the image may be determined or estimated. In some example embodiments the three dimensional motion may be a purely rotational motion, a purely translation motion, or a rotational and translational motion. The estimated three dimensional motion may be utilized to adjust the pixels of an image frame in order to rectify and stabilize the video image.

38 Claims, 6 Drawing Sheets

FIGURE 1C frame 1 frame 2 frame 3

SYSTEM AND METHOD FOR VIDEO STABILIZATION OF ROLLING SHUTTER CAMERAS

BACKGROUND

Today consumer products that allow video capture are quite common. Examples are cell-phones, music players, and regular cameras. Most of these devices, as well as camcorders in the consumer price range, have CMOS image sensors. CMOS sensors have several advantages over the conventional CCD sensors: they are cheaper to manufacture, and typically offer on-chip processing, for e.g. automated white balance and auto-focus measurements. However, most CMOS sensors, by design make use of what is known as a rolling shutter (RS). In a RS camera, detector rows are read and reset sequentially. Therefore, each row of the CMOS sensor is exposed during a slightly different time window. The more conventional CCD sensors on the other hand use a global shutter (GS), where all pixels are reset simultaneously, and collect light during the same time interval.

SUMMARY

The downside with a rolling shutter is that since pixels are acquired at different points in time, motion of either the camera or target will cause geometrical distortions in the acquired images. Previous approaches to rectification of RS video model distortions in the image plane. However, image plane analysis may not provide accurate rectification solutions. Thus, example embodiments presented herein take into account a three dimensional motion of the camera. Typically, image rectification based on camera motion is not performed as such techniques may require expensive and complicated computation. However, the example embodiments presented herein provide an accurate and efficient method of image rectification. The example embodiments presented herein rectify video images from a rolling shutter camera with a determined three dimensional motion of the camera.

Some example embodiments may be directed towards stabilizing a video image with a determination of a purely rotational three dimensional motion. Some example embodiments may be directed towards video stabilization with the determination of a purely translational three dimensional motion. Other example embodiments may be directed towards video stabilization with the determination of a rotational and translational motion of the camera.

Some example embodiments may be directed towards a method for video stabilization of a video image from a rolling shutter camera. The method may comprise identifying a plurality of first image points in a frame of a video and corresponding second image points. The corresponding second image points may be displaced with respect to the plurality of first image points in subsequent frames of the video.

The method may further comprise determining a three dimensional motion of the rolling shutter camera by analyzing the plurality of first and second image points over at least two consecutive frame references of an image. A frame reference may be a reference rotation, a reference translation, or a reference and rotation translation.

The method may also comprise interpolating the three dimensional motion for each image row from the frame references. The method may also comprise stabilizing the image by adjusting pixels associated by interpolating the estimated motion in-between the frame references.

In some example embodiments, a frame reference pair may correspond to, or cover, an entire frame of a video image. In some example embodiments, a frame reference pair may correspond to, or cover, a sub-portion of a video frame.

In some example embodiments, determining the three dimensional motion of the rolling shutter camera may further comprise mapping the plurality of first image points, x, and the corresponding second image points, y, to a three dimensional motion estimation function, H, according to an equation x=Hy.

In some example embodiments, determining the three dimensional motion of the rolling shutter camera may further comprise minimizing a deviation between the plurality of first image points, x, and the corresponding second image points, y, with respect to the three dimensional motion estimation, H.

In some example embodiments, minimizing the deviation may further comprise applying a minimization function, J, wherein $$J = \sum_{k=1}^{K} d(x_k, Hy_k)^2 + d(y_k, H^{-1}x_k)^2;$$

where d( ) is a distance function, K is a total number of corresponding points, and k is an index for the plurality of first image points and corresponding second image points.

In some example embodiments, determining the three dimensional motion of the rolling shutter camera may further comprise determining a three dimensional rotational motion.

In some example embodiments, determining the three dimensional rotational motion may further comprise mapping the plurality of first image points, x, and the corresponding second image points, y, to a three dimensional rotational estimation function, wherein $H=KR(t_1)R^T(t_2)K^{-1}$; where K is a five degree of freedom upper triangular matrix, $R(t_1)$ is a rotation estimation matrix at time $t_1$, $R^T(t_2)$ is a transposed rotation estimation matrix at time $t_2$, $t_1$ corresponds to a time when the plurality of first image points, x, was imaged, and $t_2$ corresponds to a time when the corresponding second image points, y, were imaged.

In some example embodiments, determining the three dimensional motion of the rolling shutter camera may further comprise determining a three dimensional translational motion.

In some example embodiments, determining the three dimensional translational motion may further comprise mapping the plurality of first image points, x, and the corresponding second image points, y, to a three dimensional translational estimation function, wherein $H=KD(t_1)D(t_2)^{-1}K^{-1}$; where K is a five degree of freedom upper triangular matrix, $D(t_1)$ is a translation estimation matrix at time $t_1$, $D(t_2)^{-1}$ is an inverted translation estimation matrix at time $t_2$, $t_1$ corresponds to a time when the plurality of first image points, x, was imaged, and $t_2$ corresponds to a time when the corresponding second image points, y, were imaged.

In some example embodiments, determining the three dimensional motion of the rolling shutter camera may further comprise determining a three dimensional rotational and translational motion.

In some example embodiments, determining the three dimensional rotational and translational motion may further comprise mapping the plurality of first image points, x, and the corresponding second image points, y, to a three dimensional rotational and translational estimation function, wherein $H=KR(t_1)D(t_1)D(t_2)^{-1}R(t_2)^TK^{-1}$; where K is a five degree of freedom upper triangular matrix, $R(t_1)$ is a rotation estimation matrix at time $t_1$, $R^T(t_2)$ is a transposed rotation estimation matrix at time $t_2$, $D(t_1)$ is a translation estimation matrix at time $t_1$, $D(t_2)^{-1}$ is an inverted translation estimation matrix at time $t_2$, $t_1$ corresponds to a time when the plurality of first image points, x, were imaged, and $t_2$ corresponds to a time when the corresponding second image points, y, were imaged.

In some example embodiments, determining the three dimensional motion of the rolling shutter camera may further comprise constructing a three dimensional motion frame estimation matrix, the three dimensional motion frame estimation matrix may be representative of a three dimensional motion of the plurality of first image points and the corresponding second image points with respect to the at least two consecutive frame references. The determining may be performed for each image undergoing stabilization.

In some example embodiments, interpolating the three dimensional motion for each row of the image frame may further comprise constructing a three dimensional motion row estimation matrix, the three dimensional motion row estimation matrix may be representative of a three dimensional motion of the plurality of first image points and the corresponding second image points to individual rows of the at least two consecutive frame references. The interpolating may be performed for each image undergoing stabilization.

In some example embodiments, determining the three dimensional motion of the rolling shutter camera may further comprise obtaining sensor data indicative of the three dimensional motion of the rolling shutter camera.

In some example embodiments, obtaining sensor data may further comprise obtaining sensor data from a gyroscopic sensor.

In some example embodiments, stabilizing the image may further comprise mapping at least one pixel, z, of the image according to the stabilization function $z = KR_o D_o D(t)^{-1} R^T(t) K^{-1} z$; where K is a five degree of freedom upper triangular matrix, $R_o$ is a reference rotational matrix, $D(t)^{-1}$ is an inverse translation estimation matrix at time t, $R^T(t)$ is a transposed three dimensional motion row estimation matrix at time t, and z is at least one stabilized pixel corresponding to the at least one pixel z.

In some example embodiments, stabilizing the image may further comprise utilizing the reference rotational matrix, $R_o$, in a form of a filtered sequence.

Some example embodiments may be directed towards a video stabilization unit. The video stabilization unit may comprise an identification unit that may be configured to identify a plurality of first image points in a frame of a video and corresponding second image points, the corresponding second image points may be displaced with respect to the plurality of first image points in subsequent frames of the video.

The video stabilization unit may further comprise a processing unit that may be configured to determine a three dimensional motion of the rolling shutter camera by analyzing the plurality of first and second image points over at least two consecutive frame references of the video. The video stabilization unit may further comprise an interpolation unit that may be configured to interpolate the three dimensional motion for each image row from the frame references. The video stabilization unit may also comprise a stabilization unit that may be configured to stabilize the image by adjusting pixels associated with the frame reference as a function of the interpolation.

In some example embodiments, the video stabilization unit may be configured to perform any one of the methods or steps described above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Introduction

Some example embodiments presented herein may be directed towards a system and method for providing rolling shutter video stabilization and/or rectification. In contrast to current stabilization and rectification methods that utilize image plane processing, the example embodiments presented herein utilize a three dimensional motion of the camera.

Figure 1A:
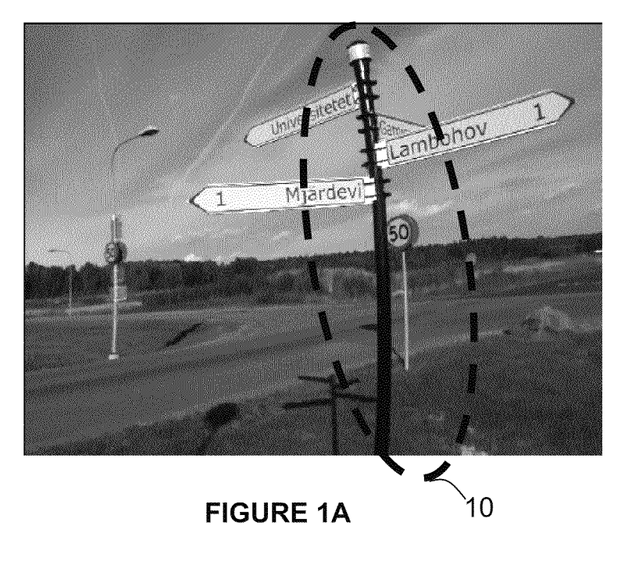
FIG. 1A is an illustrative example of an image from a moving rolling shutter camera.
Figure 1B:
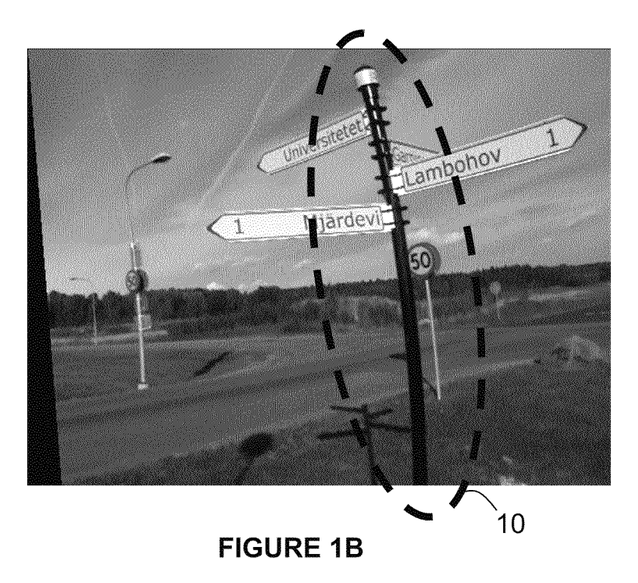
FIG. 1B is an illustrative example of an image from a rolling shutter camera that has undergone image plane processing.

FIG. 1A provides an example of an image captured with a rolling shutter camera. As shown from the image in FIG. 1A, a pole 10 comprises a bending which is the result of an image distortion caused by a moving rolling shutter camera. FIG. 1B provides an example of an image captured with a rolling shutter camera that has undergone an image plane rectification process. As shown from the image in FIG. 1B, the image distortion of the pole 10 has been slightly corrected. However, it is clear from the image of FIG. 1B that the image still has a slight bending due to rolling shutter image distortion.

Figure 1C:
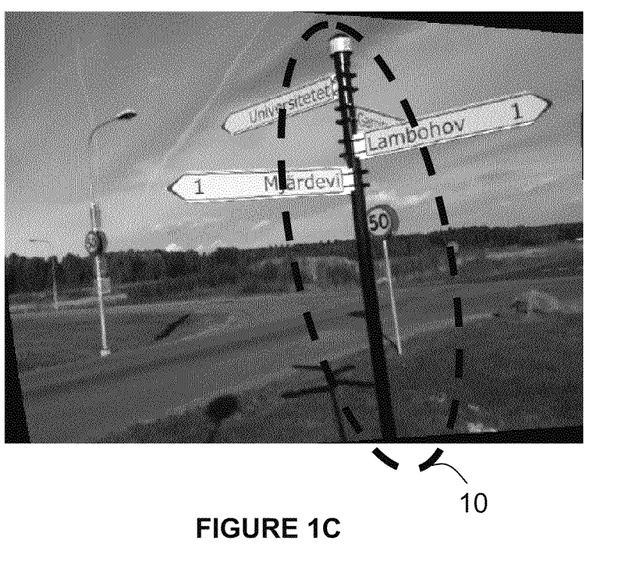
FIG. 1C is an illustrative example of an image from a rolling shutter camera that has undergone three dimensional motion processing, according to some of the example embodiments.

FIG. 1C provides an example of an image captured with a rolling shutter camera which has undergone three dimensional camera motion based processing. As shown from the image in FIG. 1C the bending to the pole 10 caused by the rolling image distortion has been eliminated. Thus, the example embodiments presented herein provide an accurate and effective method of eliminating rolling shutter camera distortions by utilizing camera motion analysis.

Figure 2:
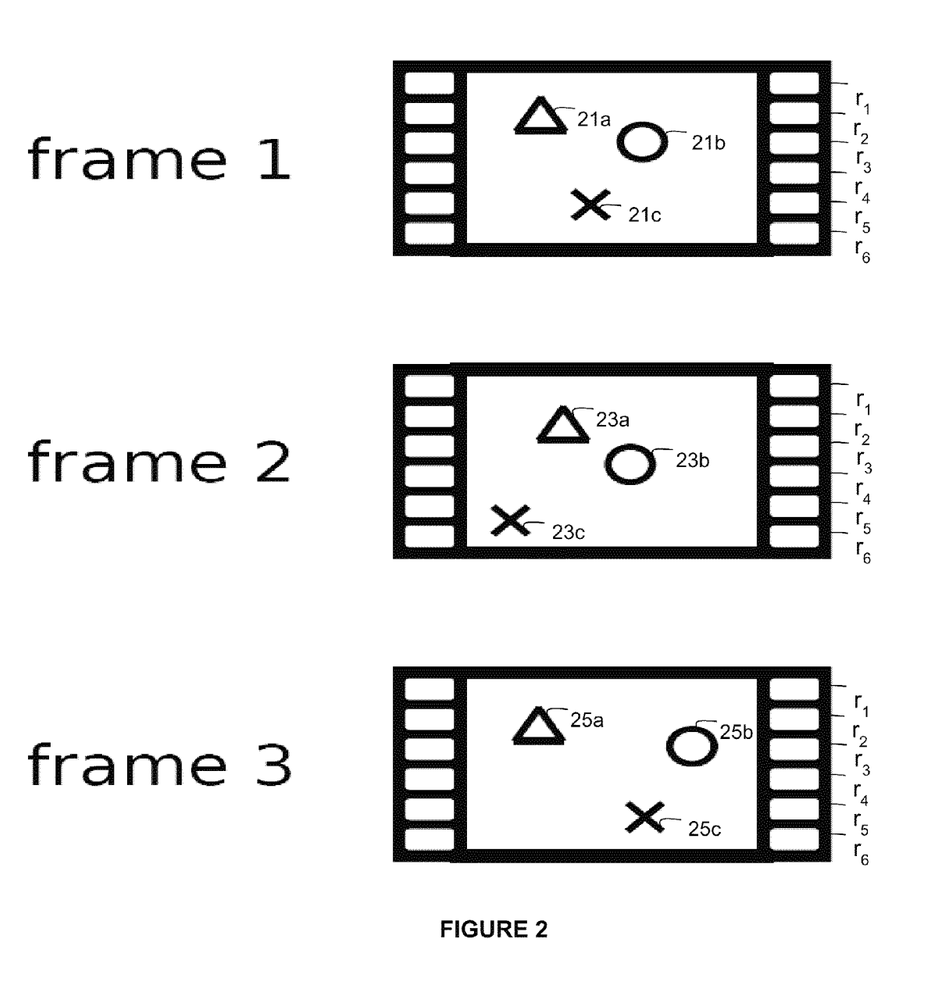
FIG. 2 is a schematic depicting an overview of the three dimensional motion processing, according to some of the example embodiments.

FIG. 2 provides an illustrative overview of the camera motion analysis utilized in removing rolling shutter image distortions. A three dimensional motion of the camera may be determined by analyzing a number of frames of a video image (e.g., frames 1-3 of FIG. 2). Each frame of a video may comprise a number of rows (labeled as $r_1$-$r_6$). It should be appreciated that while the frames of FIG. 2 only comprise 6 rows, a video frame may comprise any number of rows.

Point Identification

In frame 1, a number of image points may be identified. In the example provided by FIG. 2, frame 1 comprises three image points 21a-21c. Upon identifying the image points 21a-21c in the first frame, frame 1, the movement of the image points may be evaluated in subsequent frames, e.g., frames 2 and 3. In evaluating the movement of image points 21a-21c in subsequent frames, corresponding second image points may be identified. For example, in frame 2, the corresponding second image points may be points 23a-23c, which may represent displaced points 21a-21c, respectively, in frame 2. Similarly, in frame 3, corresponding image points 25a-25c may represent displaced points 21a-21c and 23a-23c, respectively, in frame 3.

The identification of the image points and corresponding second image points, point correspondences may be obtained with the use of point tracking. In some example embodiments, the image points may be identified using a Harris-point detection scheme in the first frame in an interval. Note that the first frame need not be the first frame of the image sequence. The identified image points may thereafter be tracked to provide the corresponding second image points by using, for example, a Kanade-Lucas-Tomasi (KLT) feature tracker. To increase the accuracy of the point tracker, some example embodiments may employ a cross-checking procedure. When the points have been tracked from the first image to subsequent frames, the tracking may be reversed and only the points that return to the original position (e.g., within a threshold) may be kept.

Motion Estimation: Overview

Once the image points and corresponding second image points have been identified, a three dimensional motion of the camera may be estimated or determined. In determining the three dimensional motion of the camera, first an estimation may be made with respect to frame references, or may be made at specific frame references. Examples of frame references are provided in FIG. 3. A frame reference pair may cover at least a sub-portion of a video frame. It should be appreciated that the frame reference pair may also cover an entire video frame or multiple video frames.

Figure 3:
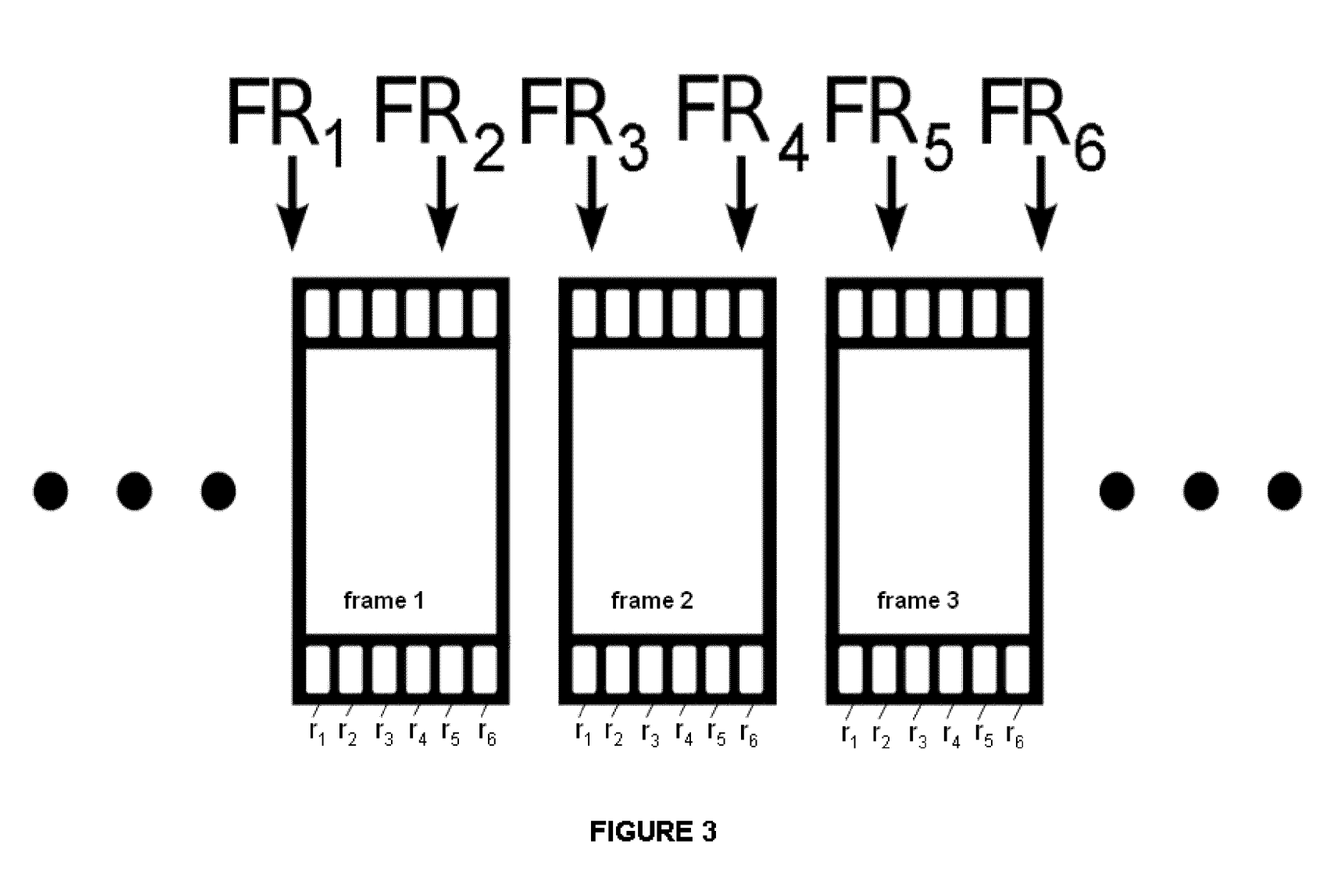
FIG. 3 is a schematic depicting an overview of three dimensional motion determination with respect to frame references, according to some of the example embodiments.

As shown in FIG. 3, each frame 1-3 comprises two frame references $FR_N$. Each frame reference pair may correspond to a number of frame rows. For example, the first and the second frame references of frame 1, $FR_1$, and $FR_2$, may correspond to rows $r_1$-$r_4$. The second and third frame references, $FR_2$, and $FR_3$, may correspond to rows $r_5 r_6$ in frame 1, and row $r_1$, in frame 2. The frame reference pair $FR_3$ and $FR_4$, may correspond to rows $r_1$-$r_4$. Frame reference pair $FR_4$, and $FR_5$, may correspond to row $r_6$ of frame 2 and rows $r_1$-$r_2$ of frame 3. Frame reference pair $FR_5$, and $FR_6$, may correspond to rows $r_3$-$r_6$ of frame 3. It should be appreciated that the placement of frame references shown in FIG. 2 is merely an example. Frame reference pairs may correspond to any number of rows from any number of frames. It should also be appreciated that the number of rows corresponding to each frame reference pair need not be identical.

The estimated three dimensional camera motion for each frame reference $FR_N$ may be provided according to the following equation:

$$x = Hy \qquad (1)$$

where x is an image point (e.g., any of image points 21a-21c), H is a three dimensional camera motion estimation matrix, and y is a corresponding second image point (e.g., any of image points 23a-23c, or 25a-25c). It should be appreciated that x and y may be expressed as homogeneous coordinates, where x may be represented by:

$$x = (s*u s*v s)^T \qquad (2)$$

where u and v are horizontal and vertical image coordinates respectively, and s is an arbitrary non-zero scalar. The image coordinates associated with x may be represented as:

$$u = \frac{x_1}{x_3} \text{ and } v = \frac{x_2}{x_3} \qquad (3)$$

where $x_1$, $x_2$, and $x_3$ are the coordinates of x, e.g., $x = (x_1\ x_2\ x_3)^T$. It should be appreciated that the corresponding second image points, y, may be represented in a similar manner.

Motion Estimation: Pure Rotation

A number of different forms of camera motion may be estimated for the respective frame references $FR_N$. In some example embodiments, a purely rotational three dimensional motion may be estimated. In a purely rotational estimation of motion, the rotation about the camera center during frame capture is estimated. The rotation may be represented as a sequence of rotation matrices, $R(t) \in SO(3)$. Thus, in a purely rotation estimation of motion, the three dimensional camera motion estimation matrix, H, may be represented by:

$$H = KR(t_1)R^T(t_2)K^{-1} \qquad (4)$$

where K is a five degree of freedom upper triangular matrix, $R(t_1)$ is a rotation estimation matrix at time $t_1$, $R^{T}(t_2)$ is a transposed rotation motion estimation matrix at a subsequent time $t_2$, $t_1$ corresponds to a time when the plurality of first image points, x, was imaged, and $t_2$ corresponds to a time when the corresponding second image points, y, were imaged.

It should be appreciated that the time parameter may be a linear function of a current image row (i.e., $x_2/x_3$ and $y_2/y_3$). Thus, by choosing the unit of time as image rows, and time zero as the top row of the first frame or frame reference, we get $t_1 = x_2/x_3$. In the second image we get $t_2 = y_2/y_3 + N_r + N_b$, where $N_r$ is the number of image rows, and $N_b$ may be defined as $N_b = t_d N/t_r = N_r(1/(f t_r) - 1)$, where $t_d$ is the inter-frame time delay, $t_r$ is the frame read out time, and f is the frame rate.

For each correspondence between the two views, equations (1) and (4) may provide two equations (after elimination of the unknown scale) where the unknowns are the rotations. Unless the rotations are constrained further, six unknowns (e.g., a rotation can be parameterized with three parameters) for each correspondence may be provided. Thus, the rotations may be parameterized with an interpolating spline with knots at each frame reference $FR_N$. Intermediate rotations may be found using, for example, spherical linear interpolation, which will be discussed in greater detail below.

As a reference, a world frame may be utilized as well as an initial value for the first frame reference $FR_1=I$, the identity matrix.

Motion Estimation: Rotation Plus Translation

The three dimensional camera motion estimated for the respective frame references $FR_N$ may also be in the form of rotational and translational motion, where imaging is assumed to take place in a planar scene. In a rotational and translational estimation, the three dimensional movement of the camera may be modeled as a sequence of translations d(t) within a three dimensional Euclidean space, and rotations $R(t) \in SO(3)$, with respect to a coordinate system located on the world plane.

The world coordinate system need not be explicitly estimated, three dimensional points may be chosen such that they have a zero third coordinate, i.e. (0 0 1) X=0. The projection of such a point in the image, after a translation $d(t_1)$, and a rotation $R(t_1)$, can be written:

$$x = KR(t_1)(X + d(t_1)) = KR(t_1)D(t_1)\tilde{X}, \qquad (5)$$

$$\text{where } D = \begin{pmatrix} 1 & 0 & d_1 \\ 0 & 1 & d_2 \\ 0 & 0 & d_3 \end{pmatrix}, \qquad (6)$$

and $\tilde{X}$ is a three element vector comprising the non-zero element of X, and 1 in the third position. Since equation (5) is invertible, the three dimensional camera motion estimation matrix, H, may be represented by:

$$H = KR(t_1)D(t_1)D(t_2)^{-1}R(t_2)^T K^{-1} \qquad (7)$$

where K is a five degree of freedom upper triangular matrix, $R(t_1)$ is a rotation estimation matrix at time $t_1$, $R^T(t_2)$ is a transposed rotation estimation matrix at time $t_2$, $D(t_1)$ is a translation estimation matrix at time $t_1$, $D(t_2)^{-1}$ is an inverted translation estimation matrix at a subsequent time $t_2$, $t_1$ corresponds to a time when the plurality of first image points, x, was imaged, and $t_2$ corresponds to a time when the corresponding second image points, y, were imaged. It should be appreciated that by setting $D(t_1)=D(t_2)=I$ the pure rotation model of equation (4) may be obtained as a special case.

In contrast to the pure rotation scenario, a rotational and translation estimation of camera motion provides a variable origin so that the values of $R_s$ and $d_s$ corresponding to $FR_1$ may need to be found. It should be appreciated that a point in the world plane, expressed in normalized camera coordinates $X_c = \lambda K^{-1}x$, should satisfy a plane equation such as:

$$\hat{r}^T X_c \rho = \hat{r}^T (X_c - \hat{r}\rho) = 0. \qquad (8)$$

Equation (8) may be used to define the transformation from the camera to the third (zero valued) world coordinate:

$$X = R_s^T(X_c - \hat{r}\rho) \text{ for } R_s = (\hat{r}_\perp \hat{r} \times \hat{r}_\perp \hat{r}). \qquad (9)$$

This provides the projection from the plane into the camera as:

$$X_c = R_s(X + (0\ 0\ \rho)^T) \qquad (10)$$

Finally, as a monocular reconstruction is only defined up to scale, the plane $\rho=1$ may be fixated. This locks the translation to $d_s=(0\ 0\ 1)^T$, and thus only the extra 3 parameters in $R_s$ are provided.

Motion Estimation: Pure Translation

It should be appreciated that the estimation of three dimensional camera motion for a corresponding frame reference, $FR_N$, may also be made with respect to a translating plane. Thus, it is possible to constrain the planar scene model to translations only. This may be achieved by setting all of the rotation matrices equal to the first, i.e., $R_n = I \forall n \in [1, N]$. Therefore, the three dimensional camera motion estimation matrix, H, may be represented by:

$$H = KD(t_1)D(t_2)^{-1}K^{-1} \qquad (11)$$

where K is a five degree of freedom upper triangular matrix, $D(t_1)$ is a translation estimation matrix at time $t_1$, $D(t_2)^{-1}$ is an inverted translation estimation matrix at a subsequent time $t_2$, $t_1$ corresponds to a time when the plurality of first image points, x, was imaged, and $t_2$ corresponds to a time when the corresponding second image points, y, were imaged.

Interpolation

Once a three dimensional camera motion has been specified, e.g., according to any of equations (4), (7), and (11) for each frame reference, $FR_N$, a three dimensional motion estimation may be provided for each row, $r_N$, within the frame reference. The translational component of the camera motion d(t) may be provided using linear interpolation. Using a parameter $w \in [0,1]$, this may be provided by:

$$d_{interp} = (1-w)d_1 + wd_2. \qquad (12)$$

For the rotational component, the interpolation may be more math intensive due to the periodic structure of SO(3). According to some example embodiments, rotations may be represented as three element vectors where the magnitude corresponds to the rotation angle, $\Phi$, and the direction is the axis of rotation, i.e., $n = \Phi \hat{n}$. This is a minimal parameterization of rotations, and it also ensures smooth variations, in contrast to, for example, Euler angles. Thus, the elements in the vectors may be used for parameter optimization. The vector n may be converted to a rotation matrix using the matrix exponent, which for a rotation may be computed using the Rodrigues formula:

$$R = expm(n) = I + [\hat{n}]_x \sin\phi + [\hat{n}]_x^2 (1 - \cos\phi) \qquad (13)$$

$$\text{where } [\hat{n}]_x = \frac{1}{\phi}\begin{pmatrix} 0 & -n_3 & n_2 \\ n_3 & 0 & -n_1 \\ -n_2 & n_1 & 0 \end{pmatrix}. \qquad (14)$$

Conversion back to vector form may be accomplished through a matrix logarithm in a general case, but for a rotation matrix, there is a closed form solution. It should be noted that two of the terms in equation (13) are symmetric, and thus terms of the form $r_{ij} - r_{ji}$ may come from the anti-symmetric part alone. This allows for the extraction of the axis and angle as follows:

$$n = \text{logm}(R) = \phi\hat{n}, \text{ where } \begin{cases} \tilde{n} = \begin{pmatrix} r_{32} - r_{23} \\ r_{13} - r_{31} \\ r_{21} - r_{12} \end{pmatrix} \\ \phi = \sin^{-1}\left(\frac{\|\tilde{n}\|}{2}\right). \\ \hat{n} = \frac{\tilde{n}}{\|\tilde{n}\|} \end{cases} \qquad (15)$$

Using equations (13) and (15), a Spherical Linear interpolation (SLERP) may be utilized between two rotations $n_1$ and $n_2$, using an interpolation parameter $w \in [0,1]$ as follows:

$$n_{diff} = \log m(\exp m(-n_1) \exp m(n_2)) \quad (16)$$

$$R_{interp} = \exp m(n_1) \exp(w \, n_{diff}). \quad (17)$$

It should be appreciated that SLERP interpolation is merely an example and that any form of interpolation may be utilized with the example embodiments.

Optimization

Once a three dimensional camera motion has been specified, e.g., according to any of equations (4), (7), and (11), the unknown motion parameters may be solved using, for example, iterative minimization. The iterative minimization may minimize a deviation between the image points, x, and the corresponding second image points, y, thereby improving accuracy of the estimation matrix H. The deviation may be achieved by applying a minimization function J, which may be represented by:

$$J = \epsilon(n_1, \ldots, n_N) \quad (18)$$

or $$J = \epsilon(n_s, n_1, n_N, d_1, \ldots, d_N) \quad (19)$$

for the pure rotation, and the planar scene models, respectively. In some example embodiments, the (symmetric) image-plane residuals of the set of corresponding points $x_k \leftrightarrow y_k$ may be minimized as follows:

$$J = \sum_{k=1}^{K} d(x_k, Hy_k)^2 + d(y_k, H^{-1}x_k)^2. \quad (20)$$

where H may be represented by any of equations (4), (7), or (11), K is a total number of corresponding points, and k is an index for the plurality of first image points and corresponding second image points. The distance function of equation (20) may be given by:

$$d(x, y)^2 = \left(\frac{x_1}{x_3} - \frac{y_1}{y_3}\right)^2 + \left(\frac{x_2}{x_3} - \frac{y_2}{y_3}\right)^2. \quad (21)$$

The rotation matrices may be obtained as:

$$R(t) = SLERP(n_1, n_2, w), \text{ for } w = (t - t_1)/(t_2 - t_1) \quad (22)$$

where SLERP is defined in equations (16) and (17), and t is a time in-between the times $t_1$ and $t_2$ corresponding to $n_1$ and $n_2$.

In some example embodiments, optimization may be obtained over short intervals of N=2, 3, or 4 frames. It should be appreciated that optimization may be performed over intervals of any size. For the pure rotation motion estimation, some example embodiments initialize a new interval from the previous one. Once the optimizer has found a solution for a group of frames, the origin may be changed to the second camera in the sequence, for example:

$$R_o = SLERP\left(n_1, n_2, \frac{N_b}{N_r + N_b}\right). \quad (23)$$

The interval may then be shifted one step, correct for the change of origin, and use the previous rotations as initializations $$R_n' = R_o^T R_{n+1}, \text{ for } n = 1, \ldots, N. \quad (24)$$

In some example embodiments, identity rotations may be used in the initialization of the rotations in newly shifted-in frames. In the planar scene model, the rotations may be initialized to identity rotations, and the translations to $d_n = (0\ 0\ 1)^T \, \forall n \in [1, N]$.

Image Rectification And Stabilization

Once the estimation matrices have been obtained for each row, the row matrices may be used to rectify and stabilize the images in the sequence. Each row may be associated with its own estimation matrix according to equation (22). The estimation matrices may be aligned to a reference row $R_o$ (which may be, for example, the middle row of the image frame), using the following equation:

$$R'(t) = R_o^T R(t). \quad (25)$$

Equation (25) provides a forward mapping as described by:

$$x' = KR_o D_o D(t)^{-1} R(t)^T K^{-1} x. \quad (26)$$

Equation (26) dictates how each point should be displaced in order to rectify and stabilize the image frame. Using the relation of equation (26), all the pixels in an image frame may be transformed into their new rectified locations. It should be appreciated that, by setting $D_o = D(t)^{-1} = I$, where I is the identity matrix, a pure rotation-based correction may be obtained as a special case.

In some example embodiments, the rectifying interpolation may be performed in three steps. First, an all-zero a Red Green Blue Alpha (RGBA) image may be created. Second, equation (26) may be applied to each pixel in the input image. The 3×3 closest grid locations may then be updated by adding vectors of the form (wr, wg, wb, w). Where r, g, b are the color channel values of the input pixel, and w is a variable weight that depends on the grid location u, according to:

$$w(u) = \exp\left(\frac{-.5\|u - \tilde{x}'\|^2}{\sigma^2}\right), \text{ where} \quad (27)$$

$$\tilde{x}' = \left(\frac{x_1'}{x_3'} \quad \frac{x_2'}{x_3'}\right)^T \quad (28)$$

$\tilde{x}'$ is the sub-pixel location of the pixel, and $\sigma$ is a smoothing parameter. In some example embodiments, the smoothing parameter may be set to $\sigma = 0.15$.

Third, after looping through all the pixels, the RGBA image may be converted to a RGB image, by dividing the RGB values by the fourth element. Alternatively, the irregular grid of pixels may be re-sampled to a regular grid, by, for example, defining a triangular mesh over the points, and sampling the mesh using bi-cubic interpolation.

It should be appreciated that a regular, or inverse interpolation, may be utilized to invert equation (26) in order to obtain:

$$x = KR(t)D(t)D_o^{-1} R_o^T K^{-1} x'. \quad (29)$$

Thus, all values of x' may be looped over and equation (29) may be used to find the pixel locations in the distorted image, and cubically interpolate these. It should be appreciated that, by setting $D_o^{-1} = D(t) = I$, where I is the identity matrix, a pure rotation-based correction may be obtained as a special case.

Video Stabilization Unit

Figure 4:
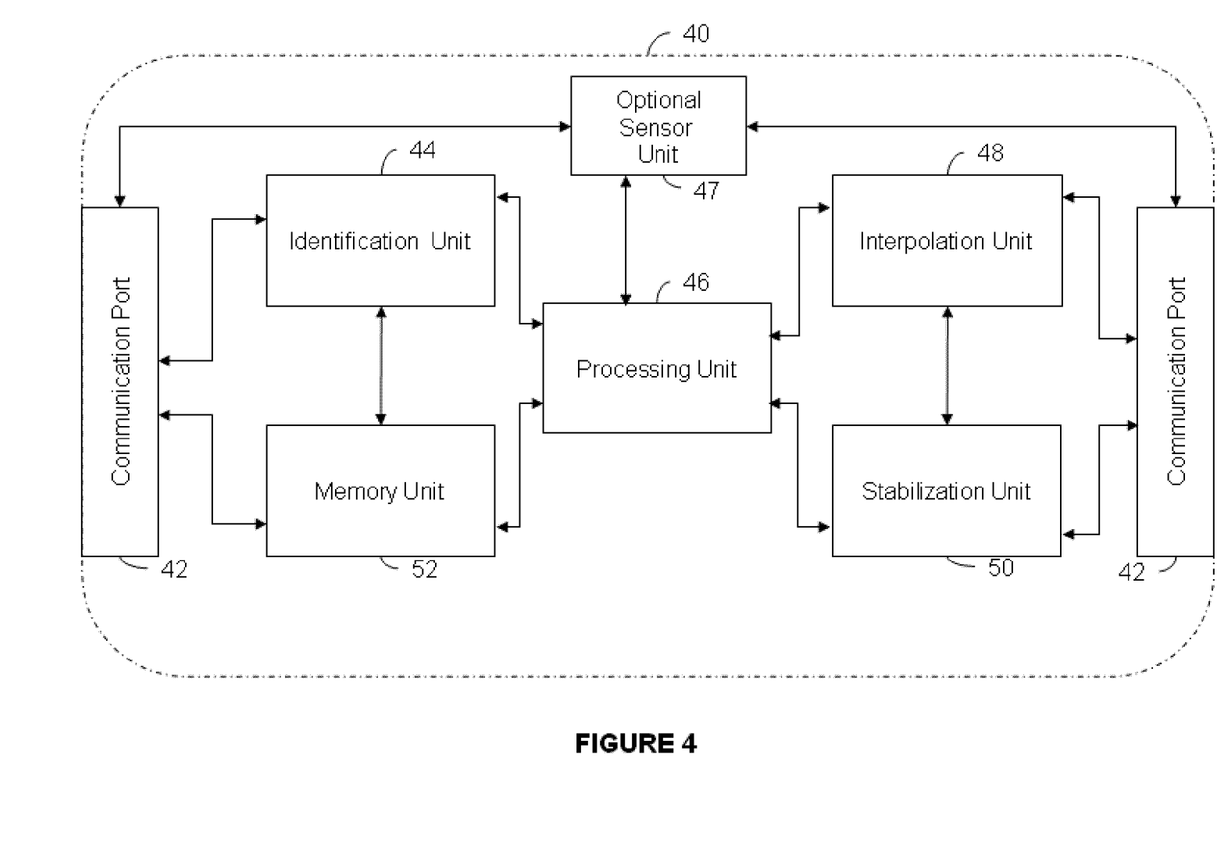
FIG. 4 is a schematic of a video stabilization unit, according to some example embodiments.

FIG. 4 is an example of a video stabilization unit 40 that may employ the example embodiments presented herein.

Figure 5:
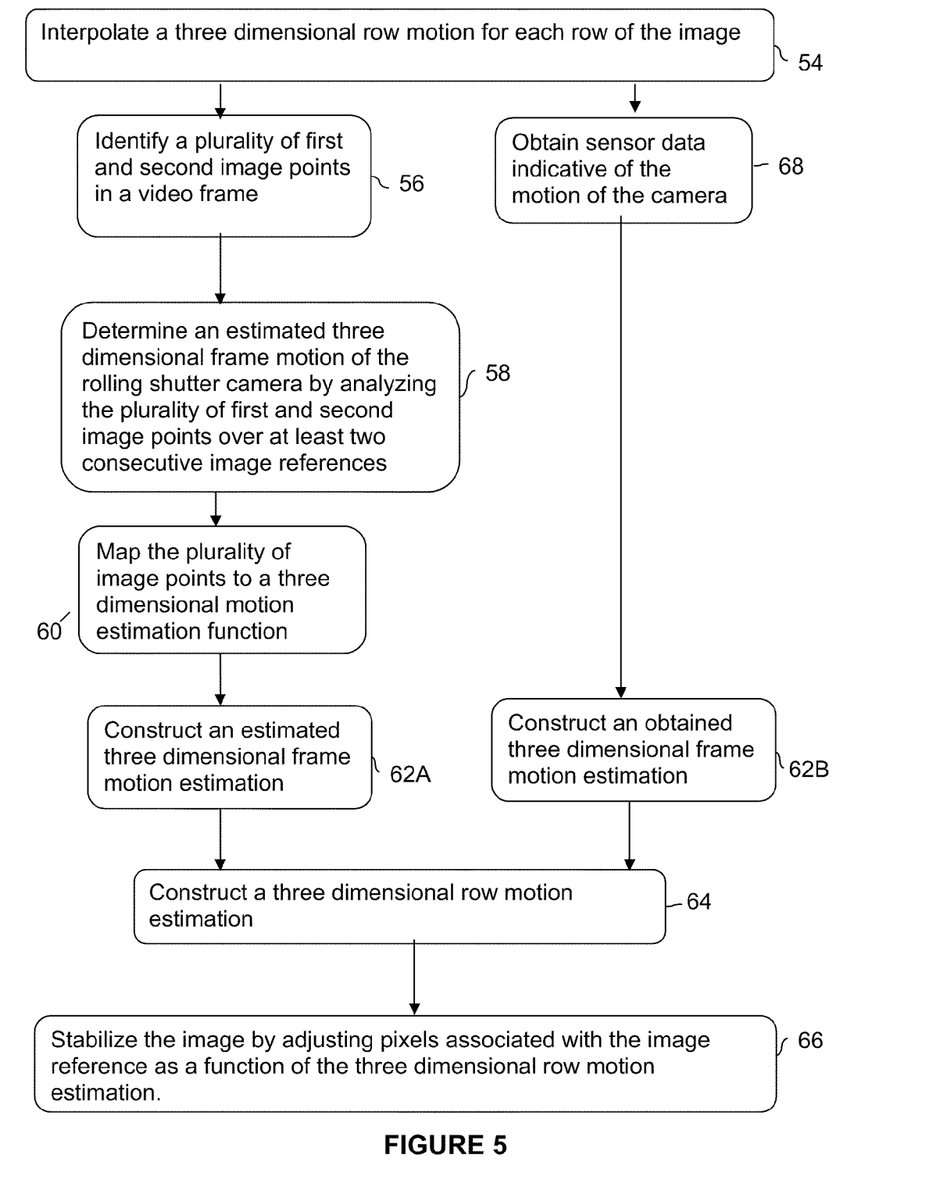
FIG. 5 is a flow diagram depicting example operational steps of the video stabilization unit of FIG. 4, according to some example embodiments.

FIG. 5 is a flow diagram depicting example operational steps that may be taken by the video stabilization unit 40 of FIG. 4. It should be appreciated that the video stabilization unit 40 may be comprised in any type of device capable of recording a rolling shutter image. Thus, the video stabilization may occur in real time, as the video image is being captured. For example, the example embodiments may be utilized in a portable multimedia device such as a laptop, mobile telephone, camcorder, conventional camera, PDA, etc.

It should be appreciated that the video stabilization unit 40 may be located in any form of computational device, for example, a computer. It should further be appreciated that the video stabilization unit need not be in a mobile device. For example, the video stabilization unit may be utilized for post image processing, wherein the video stabilization may occur after the image has been captured.

The video stabilization unit 40 may comprise any number of communication ports 42 configured to receive or transmit any form of image or measurement data (e.g., data obtained from a gyroscope sensor). It should be appreciated that the video stabilization unit 40 may alternatively comprise a single transceiver port. It should further be appreciated that the communication ports may be in the form of any input/output communications port known in the art. It should also be appreciated that the communication ports 42 may be configured to be in communication with a network or server.

The video stabilization unit 40 may also comprise an identification unit 44 that may be configured to identify any number of image points and/or corresponding second image points. The video stabilization unit 40 may further comprise a processing unit 46 that may be configured to determine the three dimensional motion of the RS camera by analyzing the image points and corresponding second image points. The video stabilization unit 40 may also comprise an interpolation unit 48 that may be configured to interpolate a three dimensional motion of the camera for each row of an image frame. The video stabilization unit 40 may also comprise a stabilization unit 50 that may be configured to stabilize an image frame by adjusting pixels of the image frame as a function of the interpolation. The video stabilization unit 40 may further comprise a sensor unit 47. The sensor unit 47 may be configured to obtain measurements of a three dimensional motion of the camera. In some example embodiments the sensor unit 47 comprises a gyroscopic sensor.

It should be appreciated that the identification unit 44, the processing unit 46, the sensor unit 47, the interpolation unit 48, and the stabilization unit 50 may be any suitable type of computation unit, e.g. a microprocessor, digital signal processor (DSP), field programmable gate array (FPGA), or application specific integrated circuit (ASIC). It should further be appreciated that the identification unit 44, the processing unit 46, the interpolation unit 48, and the stabilization unit 50 need not be comprised as four separate units. Alternatively, the identification unit 44, the processing unit 46, the sensor unit 47, the interpolation unit 48, and the stabilization unit 50 may be comprised as any number of units or as a single processing unit.

The video stabilization unit 40 may also comprise a memory unit 52. The memory unit 52 may be configured to store received, transmitted, and/or any form of data and/or executable program instructions. The memory unit 52 may be any suitable type of computer readable memory and may be of volatile and/or non-volatile type.

It should be appreciated that the communication ports 42, the identification unit 44, the processing unit 46, the sensor unit 47, the interpolation unit 48, the stabilization unit 50, and the memory unit 52 may all be in communication with one another, and may therefore be configured to transmit and receive any form of data from each unit.

In operation, the communication port 42 may receive data related to a captured image frame. It should be appreciated that the communication port 42 may receive the data in real time (e.g., as the data is being recorded). In such an instance, video stabilization may be performed in real time as the video image is being captured. It should further be appreciated that the communication port 42 may also be configured to receive the data from memory. The data from memory may be in the form of an external or internal memory unit. The data may also be stored within the memory unit 52 of the video stabilization unit. In such instance, video stabilization may be performed as a post processing stage after video capture has been completed.

Once the image data has been received, the interpolation unit may be configured to interpolate the three dimensional motion for each row of the image (54). The interpolation of the three dimensional motion may comprise the identification of image points. The identification unit 44 may be configured to identify a plurality of first image points of a current video frame (56). The identification of the first image points may be performed, for example, with the use of a Harris-detection process, as described above.

Upon identifying the plurality of first image points, the identification unit 44 may be configured to identify corresponding second image points (56). The second image points may correspond to the first image points which have been displaced in subsequent frames. The identification of the corresponding second image points may be performed, for example, with the use of a KLT tracker as described above.

Once the first and corresponding second image points have been identified, the processing unit 46 may be configured to determine a three dimensional motion of the RS camera by analyzing the plurality of first and corresponding image points over at least two consecutive frame references, $FR_N$, for example, in each image (58). The three dimensional motion of the RS camera may be obtained by the processing unit 46 mapping the plurality of image points to a three dimensional motion estimation function (60). As described above, the three dimensional motion estimation function may be in the form of a pure rotational motion, a pure translational motion, or a rotational and translational motion.

Upon mapping the image points to a motion estimation function, the processing unit 46 may determine an estimated three dimensional motion frame estimation for each frame reference $FR_N$ (62A).

It should be appreciated that the identification of image points, mapping, and the three dimensional motion frame estimation need not be obtained in order to estimate the three dimensional motion of the camera. In some example embodiments, the processing unit 46 and/or the sensor unit 47 may be configured to obtain sensor data, for example from a gyroscopic sensor (68). Thus, the sensor data may be used to determine an obtained three dimensional frame motion of the camera (62B), thereby eliminating the need for operations 56 through 62 of FIG. 5. It should further be appreciated that the use of sensor data may also be used in addition to the three dimensional motion frame estimation. Specifically, operations 56 through 62A may be performed in addition to operations 68 and 62B.

Once the three dimensional motion frame estimation and/or three dimensional camera motion via sensor data has been obtained; the interpolation unit 48 may be configured to construct a three dimensional motion row estimation corresponding to each row, $r_N$ from the motion at two or more consecutive frame references (64). Once the three dimensional motion row estimation has been obtained for each row, the stabilization unit 50 may be configured to stabilize and rectify each image frame by adjusting pixels associated with each row, $r_N$, as described above (66).

CONCLUSION

Some example embodiments may comprise a portable or non-portable telephone, media player, Personal Communications System (PCS) terminal, Personal Data Assistant (PDA), laptop computer, palmtop receiver, camera, television, radar and/or any appliance that comprises video recording equipment.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for video stabilization of a video image from a rolling shutter camera, the method comprising the steps of:
    interpolating a three dimensional row motion of the rolling shutter camera for each image row from a matrix calculation with an estimated and/or obtained three dimensional frame motion at frame references, said estimated and/or obtained three dimensional frame motion representing a three dimensional motion of the rolling shutter camera; and
    stabilizing the video image by adjusting pixels to compensate for the three dimensional row motion obtained in the interpolating step.

2. The method of claim 1 further comprising the steps of:
    identifying a plurality of first image points in a frame of the video and corresponding second image points, the corresponding second image points being displaced with respect to the plurality of first image points in subsequent frames of the video;
    determining the estimated three dimensional frame motion of the rolling shutter camera at the frame references, by analyzing the plurality of first and second image points over at least two consecutive frame references.

3. The method of claim 2, wherein the frame references are at least two consecutive frame references which cover an entire frame of a video image.

4. The method of claim 2, wherein the frame references are at least two consecutive frame references which cover a sub-portion of a video frame.

5. The method of claim 2, wherein determining the estimated three dimensional frame motion of the rolling shutter camera further comprises mapping the plurality of first image points, x, and the corresponding second image points, y, to a three dimensional frame motion estimation function, H, according to an equation x=Hy.

6. The method of claim 5, wherein determining the estimated three dimensional frame motion of the rolling shutter camera further comprises minimizing a deviation between the plurality of first image points, x, the corresponding second image points, y, with respect to the three dimensional frame motion estimation, H.

7. The method of claim 6, wherein minimizing the deviation further comprises applying a minimization function, J, wherein $$J = \sum_{k=1}^{K} d(x_k, Hy_k)^2 + d(y_k, H^{-1}x_k)^2;$$

where d( ) is a distance function, K is a total number of corresponding points, and k is an index for the plurality of first image points and corresponding second image points.

8. The method of claim 5, wherein determining the estimated three dimensional frame motion of the rolling shutter camera further comprises determining an estimated three dimensional rotational frame motion.

9. The method of claim 8, wherein determining the estimated three dimensional rotational frame motion further comprises mapping the plurality of first image points, x, and the corresponding second image points, y, to a three dimensional rotational estimation function, wherein $H=KR(t_1)R^T(t_2)K^{-1}$; where K is a five degree of freedom upper triangular matrix, $R(t_1)$ is a rotation estimation matrix at time $t_1$, $R^T(t_2)$ is a transposed rotation estimation matrix at time $t_2$, $t_1$ corresponds to a time when the plurality of first image points, x, was imaged, and $t_2$ corresponds to a time when the corresponding second image points, y, were imaged.

10. The method of claim 5, wherein determining the estimated three dimensional frame motion of the rolling shutter camera further comprises determining an estimated three dimensional translational frame motion.

11. The method of claim 10, wherein determining the estimated three dimensional translational frame motion further comprises mapping the plurality of first image points, x, and the corresponding second image points, y, to a three dimensional translational estimation function, wherein $H=KD(t_1)D(t_2)^{-1}K^{-1}$; where K is a five degree of freedom upper triangular matrix, $D(t_1)$ is a translation estimation matrix at time $t_1$, $D(t_2)^{-1}$ is an inverted translation estimation matrix at time $t_2$, $t_1$ corresponds to a time when the plurality of first image points, x, was imaged, and $t_2$ corresponds to a time when the corresponding second image points, y, were imaged.

12. The method of claim 5, wherein determining the estimated three dimensional frame motion of the rolling shutter camera further comprises determining an estimated three dimensional rotational and translational frame motion.

13. The method of claim 12, wherein determining the estimated three dimensional rotational and translational frame motion further comprises mapping the plurality of first image points, x, and the corresponding second image points, y, to a three dimensional rotational and translational estimation function, wherein $H=KR(t_1)D(t_1)D(t_2)^{-1}R(t_2)^T K^{-1}$; where K is a five degree of freedom upper triangular matrix, $R(t_1)$ is a rotation estimation matrix at time $t_1$, $R^T(t_2)$ is a transposed rotation estimation matrix at time $t_2$, $D(t_1)$ is a translation estimation matrix at time $t_1$, $D(t_2)^{-1}$ is an inverted translation estimation matrix at time $t_2$, $t_1$ corresponds to a time when the plurality of first image points, x, was imaged, and $t_2$ corresponds to a time when the corresponding second image points, y, were imaged.

14. The method of claim 2, wherein determining the estimated three dimensional frame motion of the rolling shutter camera further comprises constructing a three dimensional motion frame estimation matrix, the three dimensional motion frame estimation matrix being representative of a three dimensional motion of the plurality of first image points and the corresponding second image points with respect to the at least two consecutive frame references.

15. The method of claim 14, wherein interpolating the three dimensional row motion for each row of the image frame further comprises constructing a three dimensional motion row estimation matrix, the three dimensional motion row estimation matrix being representative of a three dimensional motion of the plurality of first image points and the corresponding second image points to individual rows of the at least two consecutive frame references.

16. The method of claim 1, wherein the three dimensional frame motion at the frame references is obtained from sensor data indicative of the three dimensional motion of the rolling shutter camera.

17. The method of claim 16, wherein obtaining sensor data further comprises obtaining sensor data from a gyroscopic sensor.

18. The method of claim 1, wherein stabilizing the image further comprises mapping at least one pixel, z, of the image according to the stabilization function $z'=KR_o D_o D(t)^{-1} R^T(t) K^{-1} z$; where K is a five degree of freedom upper triangular matrix, $R_o$ is a reference rotational matrix, $D_o$ is a reference translational matrix, $D(t)^{-1}$ is an inverse translation estimation matrix at time t, $R^T(t)$ is a transposed three dimensional motion row estimation matrix at time t, and z' is at least one stabilized pixel corresponding to the at least one pixel z.

19. The method of claim 18, wherein stabilizing the image further comprises utilizing the reference rotational matrix, $R_o$, in a form of a filtered sequence.

20. A video stabilization unit for video stabilization of a video image from a rolling shutter camera, the unit comprising:
an interpolation unit configured to interpolate a three dimensional row motion for each image row from a matrix calculation with an estimated and/or obtained three dimensional frame motion at frame references, said estimated and/or obtained three dimensional frame motion representing a three dimensional motion of the rolling shutter camera; and
a stabilization unit configured to stabilize the video image by adjusting pixels associated with the frame references to compensate for the three dimensional row motion.

21. The unit of claim 20 further comprising:
an identification unit configured to identify a plurality of first image points in a frame of a video and corresponding second image points, the corresponding second image points being displaced with respect to the plurality of first image points in subsequent frames of the video; and
a processing unit configured to determine the estimated three dimensional frame motion of the rolling shutter camera by analyzing the plurality of first and second image points over at least two consecutive frame references.

22. The unit of claim 21, wherein the least two consecutive frame references cover an entire frame of a video image.

23. The unit of claim 21, wherein at least two consecutive frame references cover a sub-portion of a video frame.

24. The unit of claim 21, wherein the processing unit is further configured to map the plurality of first image points, x, and the corresponding second image points, y, to a three dimensional frame motion estimation function, H, according to an equation x=Hy.

25. The unit of claim 24, wherein the processing unit is further configured to minimize a deviation between the plurality of first image points, x, the corresponding second image points, y, with respect to the three dimensional frame motion estimation, H.

26. The unit of claim 25, wherein the processing unit is further configured to minimize the deviation according to a minimization function, J, where $$J = \sum_{k=1}^{K} d(x_k, Hy_k)^2 + d(y_k, H^{-1}x_k)^2;$$

where d( ) is a distance function, K is a total number of corresponding points, and k is an index for the plurality of first image points and corresponding second image points.

27. The unit of claim 24, wherein the processing unit is further configured to determine the estimated three dimensional frame motion of the rolling shutter camera as an estimated three dimensional rotational frame motion.

28. The unit of claim 27, wherein the processing unit is further configured to map the plurality of first image points, x, and the corresponding second image points, y, to a three dimensional rotational frame estimation function, wherein $H=KR(t_1)R^T(t_2)K^{-1}$; where K is a five degree of freedom upper triangular matrix, $R(t_1)$ is a rotation estimation matrix at time $t_1$, $R^T(t_2)$ is a transposed rotation estimation matrix at time $t_2$, $t_1$ corresponds to a time when the plurality of first image points, x, was imaged, and $t_2$ corresponds to a time when the corresponding second image points, y, were imaged.

29. The unit of claim 24, wherein the processing unit is further configured to determine the estimated three dimensional frame motion of the rolling shutter camera as an estimated three dimensional translational frame motion.

30. The unit of claim 29, wherein the processing unit is further configured to map the plurality of first image points, x, and the corresponding second image points, y, to a three dimensional translational estimation function, wherein $H=KD(t_1)D(t_2)^{-1}K^{-1}$; where K is a five degree of freedom upper triangular matrix, $D(t_1)$ is a translation estimation matrix at time $t_1$, $D(t_2)^{-1}$ is an inverted translation estimation matrix at time $t_2$, $t_1$ corresponds to a time when the plurality of first image points, x, was imaged, and $t_2$ corresponds to a time when the corresponding second image points, y, were imaged.

31. The unit of claim 24, wherein the processing unit is further configured to determine the estimated three dimensional frame motion of the rolling shutter camera as an estimated three dimensional rotational and translational frame motion.

32. The unit of claim 31, wherein the processing unit is further configured to map the plurality of first image points, x, and the corresponding second image points, y, to a three dimensional rotational and translational estimation function, wherein $H=KR(t_1)D(t_1)D(t_2)^{-1}R(t_2)^TK^{-1}$; where K is a five degree of freedom upper triangular matrix, $R(t_1)$ is a rotation estimation matrix at time $t_1$, $R^T(t_2)$ is a transposed rotation estimation matrix at time $t_2$, $D(t_1)$ is a translation estimation matrix at time $t_1$, $D(t_2)^{-1}$ is an inverted translation estimation matrix at time $t_2$, $t_1$ corresponds to a time when the plurality of first image points, x, was imaged, and $t_2$ corresponds to a time when the corresponding second image points, y, were imaged.

33. The unit of claim 21, wherein the processing unit is further configured to construct a three dimensional motion frame estimation matrix, the three dimensional motion frame estimation matrix being representative of a three dimensional motion of the plurality of first image points and the corresponding second image points with respect to the at least two consecutive frame references.

34. The unit of claim 33, wherein the interpolating unit is further configured to construct a three dimensional motion row estimation matrix, the three dimensional motion row estimation matrix being representative of a three dimensional motion of the plurality of first image points and the corresponding second image points to individual rows of the at least two consecutive frame references.

35. The unit of claim 20, wherein the interpolation unit is further configured to obtain sensor data indicative of a motion of the rolling shutter camera in order to provide the obtained three dimensional frame motion of the rolling shutter camera.

36. The unit of claim 35, wherein sensor data is provided by a gyroscopic sensor.

37. The unit of claim 21, wherein the stabilizing unit is further configured to map at least one pixel, z, of the image according to the stabilization function $z'=KR_oD_oD(t)^{-1}R^T(t)K^{-1}z$; where K is a five degree of freedom upper triangular matrix, $R_o$ is a reference rotational matrix, $D_o$ is a reference translational matrix, $D(t)^{-1}$ is an inverse translation estimation matrix at time t, $R^T(t)$ is a transposed three dimensional motion row estimation matrix at time t, and z' is at least one stabilized pixel corresponding to the at least one pixel z.

38. The unit of claim 37, wherein the reference rotational matrix $R_o$ is a filtered sequence.

* * * * *